(12) United States Patent
Johnson et al.

(10) Patent No.: US 11,377,235 B2
(45) Date of Patent: Jul. 5, 2022

(54) METHOD AND APPARATUS FOR SATELLITE DEPLOYMENT

(71) Applicant: L2 SOLUTIONS, LLC, Houston, TX (US)

(72) Inventors: Michael David Johnson, Tomball, TX (US); Victor James Dube, McDade, TX (US); Tyler Gerald Holden, Bastrop, TX (US)

(73) Assignee: L2 SOLUTIONS, LLC, Houston, TX (US)

( * ) Notice: Subject to any disclaimer, the term of this patent is extended or adjusted under 35 U.S.C. 154(b) by 227 days.

(21) Appl. No.: 16/775,052

(22) Filed: Jan. 28, 2020

(65) Prior Publication Data

US 2020/0339287 A1 Oct. 29, 2020

Related U.S. Application Data

(60) Provisional application No. 62/839,608, filed on Apr. 26, 2019.

(51) Int. Cl.
*B64G 1/22* (2006.01)
*B64G 1/12* (2006.01)
*B64G 1/64* (2006.01)

(52) U.S. Cl.
CPC ............... *B64G 1/222* (2013.01); *B64G 1/12* (2013.01); *B64G 1/641* (2013.01); *B64G 1/646* (2013.01); *B64G 2001/643* (2013.01)

(58) Field of Classification Search
CPC ... B64G 1/222; B64G 1/646; B64G 2001/643
See application file for complete search history.

(56) References Cited

U.S. PATENT DOCUMENTS

| | | | |
|---|---|---|---|
| 2016/0075452 A1* | 3/2016 | Robles | B64G 1/641 244/173.3 |
| 2018/0170586 A1* | 6/2018 | Riskas | B64G 1/641 |
| 2020/0255271 A1* | 8/2020 | O'Connell | B60D 1/52 |

* cited by examiner

*Primary Examiner* — Timothy D Collins
*Assistant Examiner* — Rodney M Henry
(74) *Attorney, Agent, or Firm* — Hulsey P.C.

(57) ABSTRACT

A method and apparatus for deploying satellites is disclosed a satellite deployment mechanism includes an enclosure having at least one door, a lift table implemented therein, and a spring arranged to apply force to the lift table. A mounting system is arranged to allow for the satellite deployment mechanism to be mounted to a portion of a spacecraft. Responsive to opening the at least one door, the spring may cause the lift table to eject one or more satellites from the enclosure.

16 Claims, 9 Drawing Sheets

METHOD AND APPARATUS FOR SATELLITE DEPLOYMENT

The present application claims priority to U.S. Prov. Appl. No. 62/839,608, filed Apr. 26, 2019, which is incorporated by reference herein in its entirety.

BACKGROUND

Technical Field

This disclosure relates to satellites, and more particularly, to various embodiments of a method and apparatus for deploying satellites.

Description of the Related Art

Satellites are typically deployed from a parent spacecraft or a launch vehicle. Larger satellites (e.g., >1000 kg) may often times be deployed directly from a launch vehicle into a desired orbit. Smaller satellites, such as nanosatellites (e.g., 1-10 kg) may be deployed from a parent spacecraft that has been placed into orbit, using a deployment mechanism. The parent spacecraft may maneuver into a desired orbit. Thereafter, the deployment mechanism may apply a force to push the satellite away from the parent spacecraft.

In recent years, the miniaturization of various technologies has enabled the construction of small satellites having the same functionality previously only available to larger satellites. In addition to the nanosatellite example given above, other examples of small satellites include picosatellites (e.g., 100 g to 1 kg) and some smaller classifications as well. Cube satellites, or cubesats, cover a range of 0.2 kg to 40 kg. Given their small mass and the costs for launching a single satellite into orbit, deployment mechanisms have been developed to enable the deployment of multiple small satellites.

SUMMARY

The present disclosure is directed to various embodiments of a method and apparatus for deploying satellites. In one embodiment, a satellite deployment mechanism includes an enclosure having at least one door, a lift table implemented therein, and a spring arranged to apply force to the lift table. A mounting system is arranged to allow for the satellite deployment mechanism to be mounted to a portion of a spacecraft. Responsive to opening the at least one door, the spring may cause the lift table to eject one or more satellites from the enclosure.

In one embodiment, the mounting system may be attached to a common berthing mechanism (CBM) of a spacecraft. The mounting system may be arranged to mount multiple instances of the satellite deployment mechanism, in one embodiment, the mounting system may be attached to an unmodified version of the CBM. The mounting system may be attached prior to launch of the spacecraft into orbit, or on orbit when the spacecraft is docked to, e.g., a space station or other spacecraft. Once attached, the instances of the satellite deployment mechanism may be mounted. Once the spacecraft is in the desired orbit, a satellite or satellites may be deployed from various instances of the satellite deployment mechanism.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," other components, etc.) may be described or claimed as "configured" to perform one or more tasks or operations. This formulation—[entity] configured to [perform one or more tasks]—is used herein to refer to structure (i.e., something physical, such as a mechanical device). More specifically, this formulation is used to indicate that this structure is arranged to perform the one or more tasks during operation. A structure can be said to be "configured to" perform some task even if the structure is not currently being operated. An "ejection mechanism configured to eject an object" is intended to cover, for example, a mechanism or part thereof that performs this function during operation, even if not currently in use. Thus, an entity described or recited as "configured to" perform some task refers to something physical, such as a mechanism, machine, or part used to implement the task, etc. This phrase is not used herein to refer to something intangible.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f)

during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known structures, mechanisms, and techniques have not been shown in detail to avoid obscuring the disclosed embodiments.

DETAILED DESCRIPTION OF EMBODIMENTS

The present disclosure is directed to various method and apparatus embodiments for launching satellites from a parent spacecraft. With the miniaturization of many technologies in recent years, the miniaturization of satellites has followed. Accordingly, deployment systems have been developed which can be used to eject a satellite from a parent spacecraft. For example, one common type of deployment system ejects a satellite along the long axis of a guide rail. However, the geometry of various previous satellite deployment systems can be limiting, particularly when the long axis of the guide rail is parallel to the direction in which a satellite is to be deployed.

The present disclosure contemplates a satellite deployment mechanism that is not limited by the geometry of the previous satellite deployment systems discussed above. The satellite deployment mechanism disclosed herein may be implemented in a vestibule of a common berthing mechanism (CBM) which is used to dock and create a pressurized passage between two different spacecraft. For example, the satellite deployment mechanism may be used in a passive CBM (PCBM) e.g., that of the Dragon capsule of SpaceX, that is arranged for docking with an active CBM (ACBM) that is used on the International Space Station (ISS). Various types of spacecraft having a PCBM suitable for docking with the ACIBM of the ISS may utilize the satellite deployment mechanism of the present disclosure. It is noted however, that the disclosure is not limited to the CBM apparatus used with the ISS, and that use of the satellite deployment mechanism with other types of CBM arrangements is possible and contemplated.

The satellite deployment mechanism disclosed herein may utilize previously unused space inside of the CBM. For example, when a spacecraft is docked to the ISS, personnel on board may quickly install the satellite deployment mechanism and a desired number of satellites that can be deployed therefrom. It is also contemplated that the satellite deployment mechanism may be installed in a spacecraft prior to its launch from Earth into orbit.

In various embodiments, the satellite deployment mechanism includes an enclosure having one or more doors, a lift table implemented within the enclosure, and spring arranged to apply force to the lift table and thus eject the satellite(s) contained within the enclosure. For example, the enclosure may be shaped as a rectangular box, with one or two doors along one of the long sides of the box. When closed, the door(s) may restrain one or more satellites contained therein. When the doors are opened, the satellites are no longer restrained, and the spring may release to push the lift table, and thus the satellites toward and through the opening, thereby ejecting them from the satellite deployment mechanism. It is noted that the direction at which the spring applies the force is the shorter axis of the enclosure. Due to this geometry, the satellite deployment mechanism may be implemented in the limited space of the vestibule in a CBM.

The satellite deployment mechanism may be mounted to the spacecraft by a mounting system. In one embodiment, mounting system may be attached to an unmodified portion of a CBM, such as a PCBM. The mounting system may be arranged such that a number of instances of the satellite deployment mechanism may be implemented in the spacecraft at any given time. Accordingly, the satellite deployment mechanism and the mounting system for attaching the mechanism to a portion of a spacecraft may thus enable a number of satellites to be deployed on a single flight. Various embodiments of the satellite deployment mechanism and corresponding mounting system are now discussed in further detail below with reference to the accompanying figures.

Figure 1A:
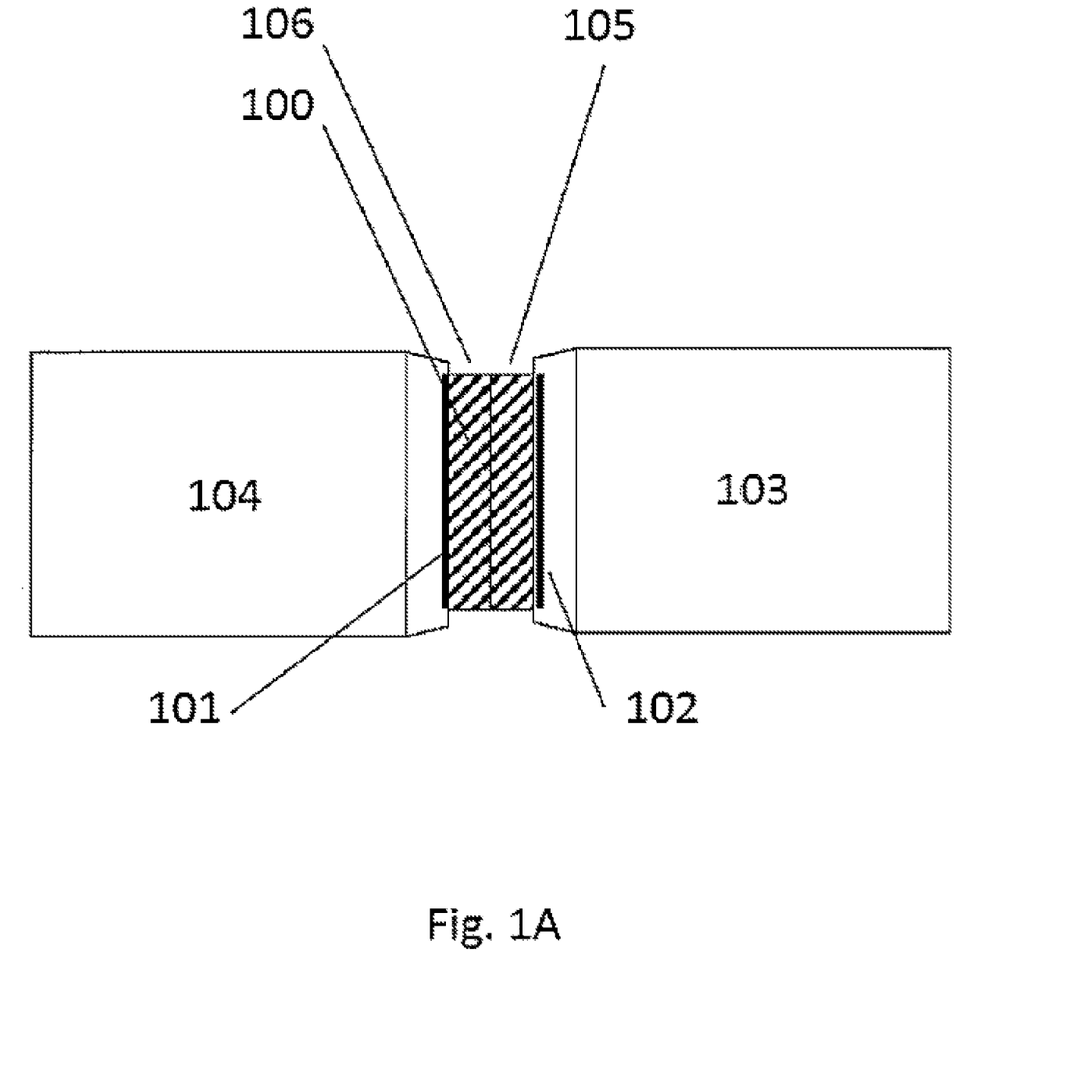
FIG. 1A illustrates one embodiment of a common berthing mechanism having both active and passive portions.

FIG. 1A illustrates one embodiment of a CBM having both active and passive portions. In the embodiment shown, a spacecraft 103 and a space station module 104 (or other spacecraft) are docked to one another. Both spacecraft 103 and space station module 104 include a pressurized volume therein. Spacecraft 103 includes a CBM 105 which is shown as attached to an ACBM 106 of space station module 104. When CBM 105 is attached to ACBM 106, a vestibule 100 is formed between spacecraft 103 and space station module 104. This vestibule 100 may be sealed from the external space environment when CBM 105 and ACBM 106 are coupled to one another. The vestibule 100 may then be pressurized to an atmospheric pressure that is substantially equal to that in space station module 104 and/or spacecraft 103. This may enable personnel to open hatches 101 and 102 of space station module 104 and spacecraft 103, respectively, and pass there between.

When spacecraft 103 is to undock from space station module 104, their respective hatches 102 and 101 are closed, and any remaining pressure within vestibule 100 may be released. Thereafter, ACBM 106 may release CBM 105, allowing spacecraft 103 to maneuver away from space station module 104.

The present disclosure contemplates, when spacecraft 103 is docked to space station module 104, that the mounting system and instances of the spacecraft deployment mechanism may be placed into the portion of vestibule 100 formed by CBM 105. This may enable satellites to be loaded into the instance of the spacecraft deployment mechanism. Subsequent to undocking, spacecraft 103 may maneuver to release the various satellites into their desired orbits.

Figure 1B:
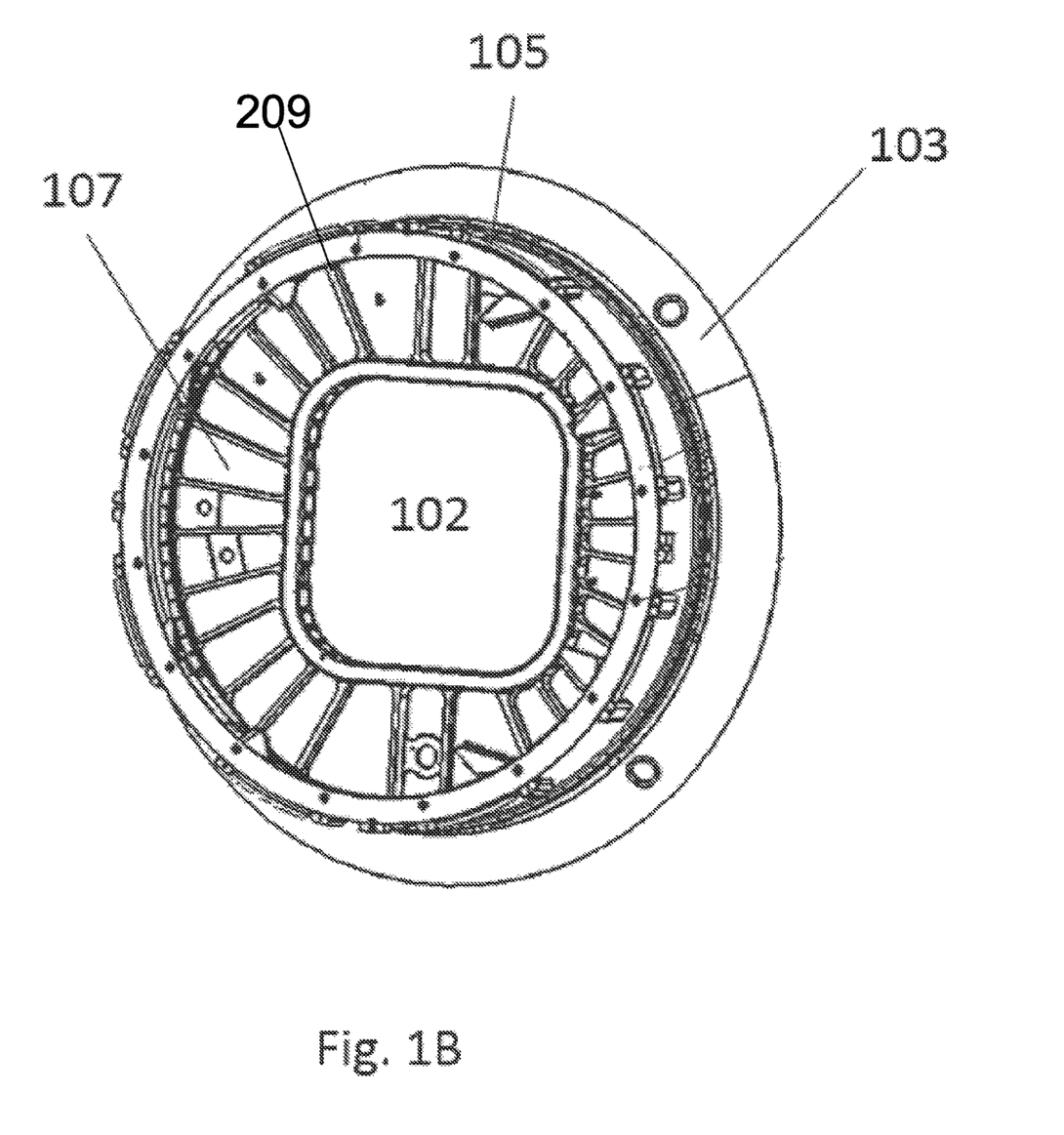
FIG. 1B illustrates a passive portion of one embodiment of a common berthing mechanism.

FIG. 1B illustrates a passive portion of one embodiment of a common berthing mechanism. In the embodiment shown, CBM 105 includes a bulkhead 107. Along the bulkhead 107 are a number of ribs 209, which may be used to attach the mounting system, as will be discussed in further detail below. An opening 102-E may be closed when a corresponding hatch (as discussed above) is closed. When the hatch is open, personnel and/or various materials (e.g., supplies) may be passed through the opening.

It is noted that this embodiment of CBM 105 as shown here includes no modifications with respect to its original implementation. However, the ribs 107 may be utilized to attach a mounting system, thereby enabling the mounting of the satellite deployment mechanism discussed herein.

Figure 2A:
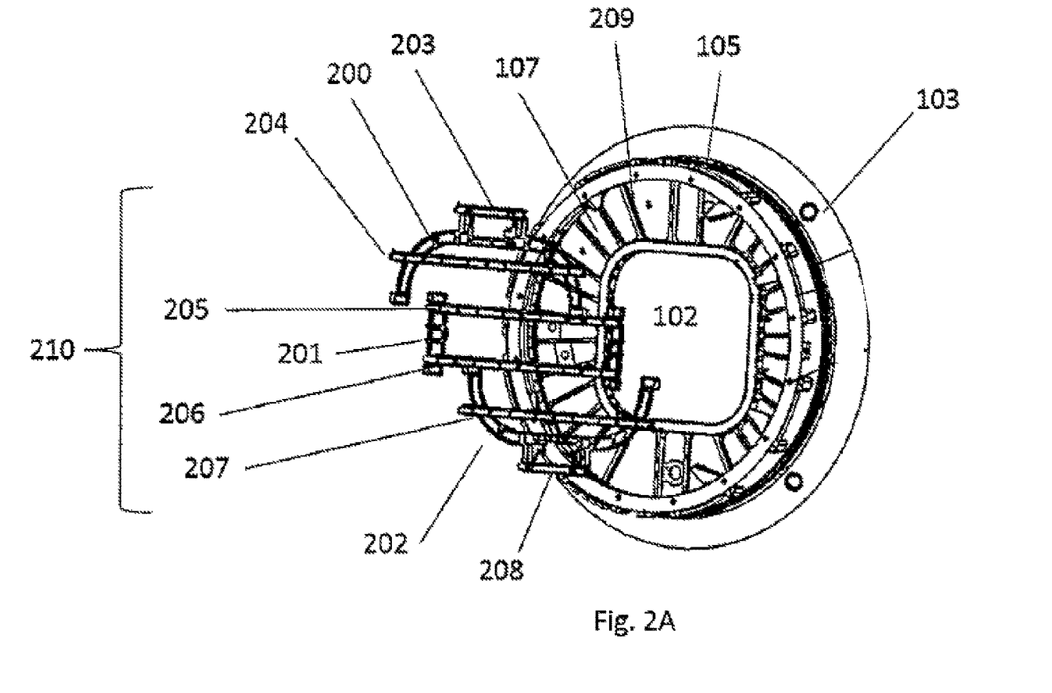
FIG. 2A depicts an exploded view of one embodiment of a mounting system for a common berthing mechanism.

FIG. 2A depicts an exploded view of one embodiment of a mounting system used to mount a satellite deployment mechanism in a CBM. In the embodiment shown, mounting system 210 includes a number of different components. Base brackets 200, 201, and 202 may attach to cross rails 203-208. The base brackets 200-202 may clamp under the ribs 209 of bulkhead 107 using various mechanisms. For example, the present disclosure contemplates a sliding block attached to base brackets 200, 201, and/or 202 that can jam under the T-shaped portion of various ones of ribs 209. This may enable the corresponding ones of base brackets 200, 201, and/or 202 to be locked in place. Since the ribs 209 already exist on bulkhead 107, the mounting system can be attached without modification to CBM 105.

When attached to the CBM, mounting system 210 may allow for the mounting of a number of instances of the satellite deployment mechanism. This may enable a number of satellites to be deployed from a single installation of the mounting assembly, which can result in significant cost savings over deploying only a single satellite or small number of satellites from a single spacecraft flight. Furthermore, mounting system is designed such that it may be easily attached by personal in, e.g., the ISS, or by ground personnel at a launch site.

Figure 2B:
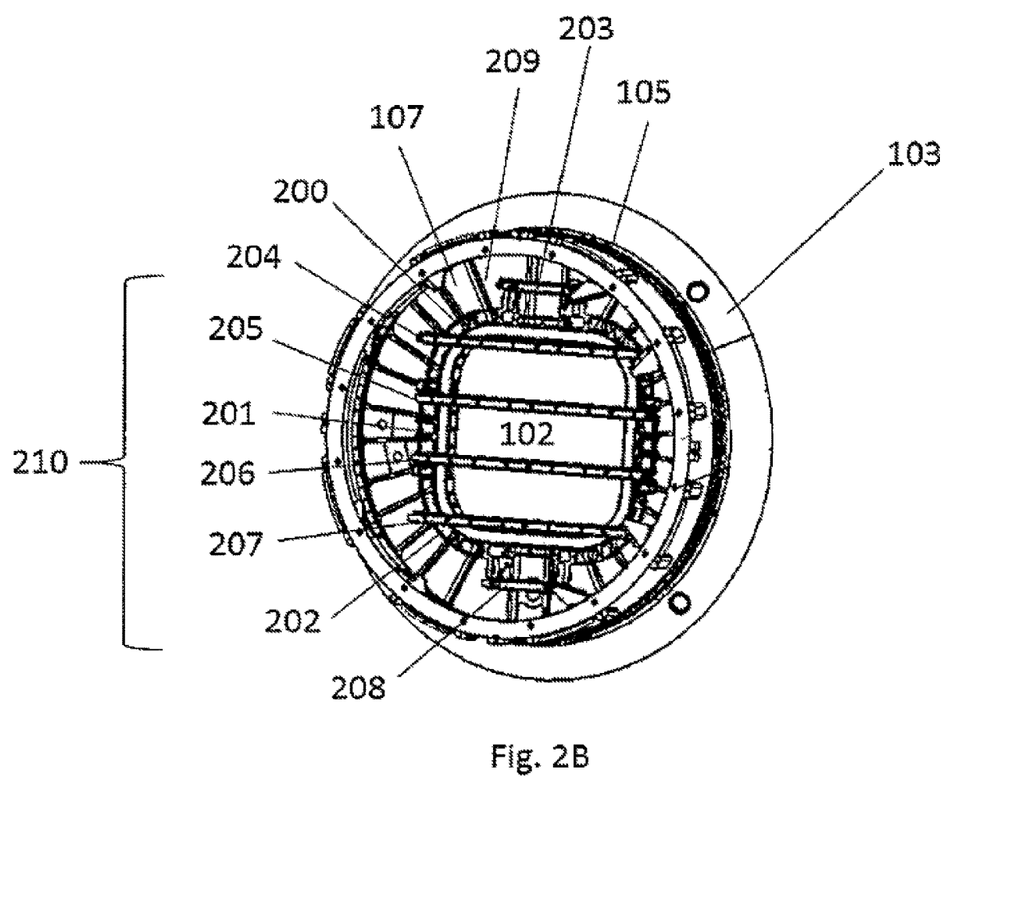
FIG. 2B depicts an installed view of one embodiment of mounting system in a common berthing mechanism.

FIG. 2B depicts an installed view of one embodiment of a mounting system 21—in a CBM. In the embodiment shown, base brackets 200-202 are attached to cross-rails 203-208. More particularly, base brackets 200-202 may each include sliding block that can be secured under the T-shaped ribs 209. Meanwhile, the cross-rails 203-208 provide for locating of the satellite deployment mechanisms and locking attachment points for securing the same.

Figure 3A:
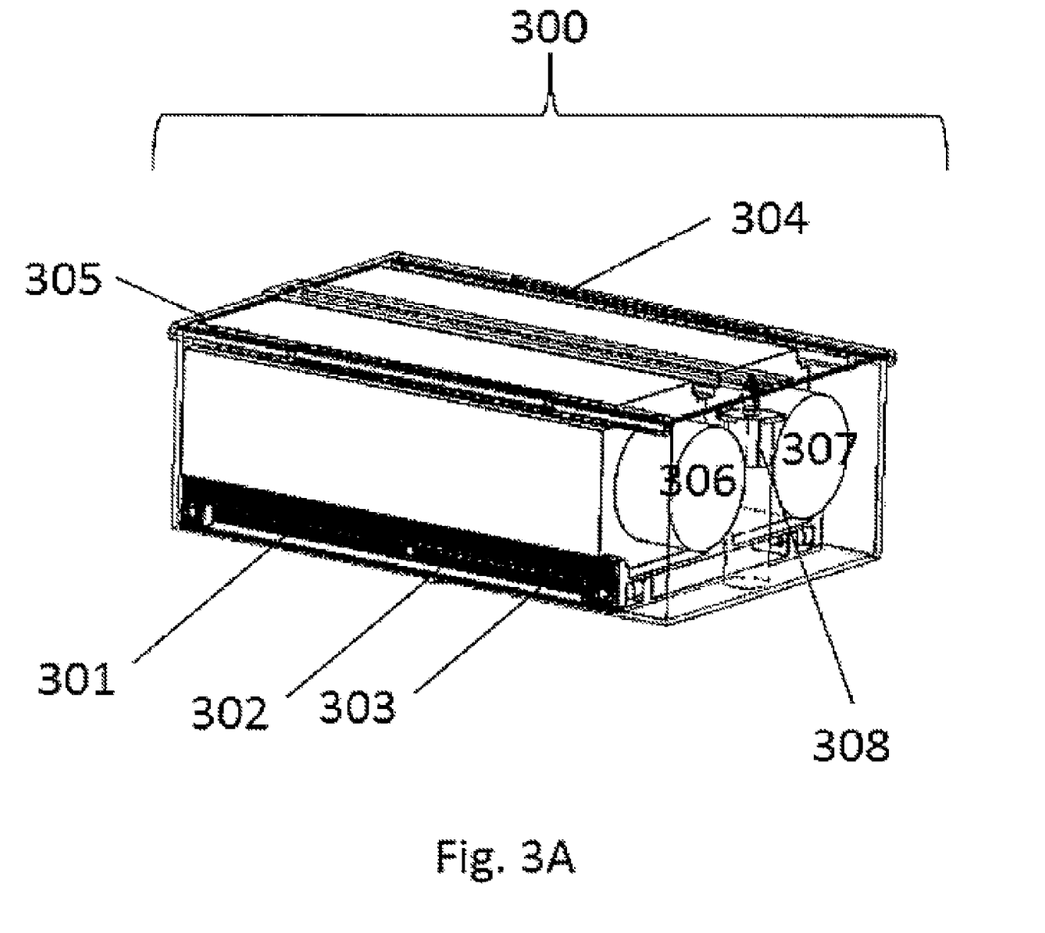
FIG. 3A exhibits an isometric cutaway drawing of one embodiment of a satellite deployment mechanism in a pre-deployment configuration.

FIG. 3A exhibits an isometric cutaway drawing of a one embodiment of a satellite deployment mechanism in a pre-deployment configuration. In the embodiment shown, satellite deployment mechanism 300 is shown as a rectangular box having satellites 306 and 307 contained and restrained therein. In this particular example, satellite deployment mechanism includes two doors, doors 304 and 305 that, when shut, restrain satellites 306 and 307 within satellite deployment mechanism. It is noted that embodiments having a single door instead of two are shown here are possible and contemplated. A separation mechanism 308 (sometimes referred to as a separation nut) is implemented within satellite deployment mechanism 308 holds doors in the shut position, and thus enables restraining of satellites 306 and 307. Responsive to a command received from an external source (e.g., an electrical signal), separation mechanism 308 may release the doors, allowing them to open and thus allowing deployment of satellites 306 and 307.

Satellites 306 and 307, when placed within the enclosure of satellite deployment mechanism 300, are place on a lift table 303. Underneath the lift table is at least one spring 302 which is arranged to eject the satellites from the enclosure at a specified velocity. The specified velocity is determined by the force of spring 302. Satellite deployment mechanism 300 also includes a guiding mechanism 301 that controls the direction of lift table 301 when the restraint is released by opening doors 304 and 305. When in the flat position shown here, guiding mechanism 301 forms parallelograms on each side of lift table 303. Guiding mechanism 301 in the embodiment shown is arranged such that, when the restraint is released, the lift table 303 ejects the satellites 306 and 307 in a single direction that is normal (perpendicular) to the plane of the lift table and without, e.g., without torques or other forces being applied to the satellites. Furthermore, this single-direction force may be applied irrespective of a center of mass/gravity or a shape of satellites 306 and 307.

Figure 3B:
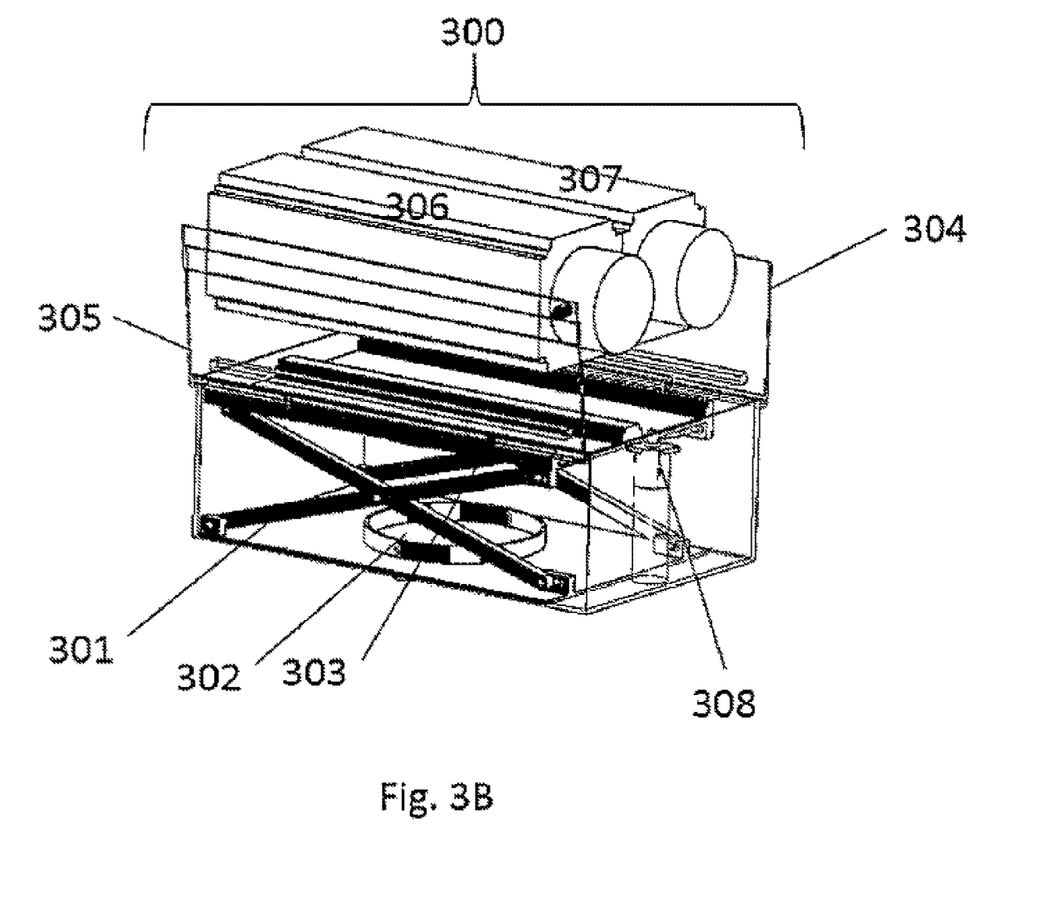
FIG. 3B exhibits an isometric cutaway drawing one embodiment of a of a satellite deployment mechanism in a post-deployment configuration.

FIG. 3B exhibits an isometric cutaway drawing one embodiment of a of a satellite deployment mechanism in a post-deployment configuration. In this particular example, both doors 304 and 305 are open while satellites 306 and 307 are being ejected from the enclosure of satellite deployment mechanism 300. Lift table 303 is shown in the raised position, due to spring 302 having applied its force to push it towards the opening in the enclosure resulting from open doors 304 and 305. Guiding mechanism 301 is also shown in its raised position, having guided lift table 303 as it is pushed by spring 302 toward the opening in the enclosure. As previously noted, spring 302 is selected to apply an amount of force to lift, table 303 such that the satellites 306 and 307 are ejected at a pre-determined velocity. As also noted above, guiding mechanism 301 controls the direction such that these satellites are ejected in a direction that is normal to the plane of lift table 303.

Given the orientation of satellites 306 and 307 in the illustrated example, their ejection from satellite deployment mechanism is in the direction that is orthogonal to their long axis, and thus they are effectively ejected "sideways". This is in contrast to various types of previously known satellite deployment systems in which such satellites would be ejected along the long axis of a sliding rail, with the long axis of the satellite being parallel with the same. Due to this geometry and the direction at which satellites 306 and 307 are ejected therefrom, satellite deployment mechanism 300 may utilize the limited space within the vestibule of a CBM in a manner that is not possible with other satellite deployment systems. For example, the PCBM discussed above for use with the ACBM of the ISS, the vestibule space is limited to approximately 250 mm in depth, which is insufficient to accommodate deployers that eject satellites along the long axis of a sliding rail. However, at least some embodiments of the satellite deployment mechanism 300 and corresponding mounting system 210 of the present disclosure may fit within this limited depth and may potentially accommodate a larger number of satellite relative to the sliding rail satellite deployers.

A further advantage provided by satellite deployment mechanism 300 is due to the arrangement of lift table 303 and the guiding mechanism 301. This arrangement may eliminate any need for specifically tailored deployment springs to accommodate a center of mass/gravity of the satellites to be deployed. Accordingly, the springs need only be chosen for the amount of force to be applied to eject the satellites at the desired velocity. Furthermore, as noted above, guiding mechanism 301 may ensure that the satellites are ejected from the enclosure in a single direction that is normal with respect to the plane of the lift table 303 and without any additional displacements or torques applied thereto.

Figure 4:
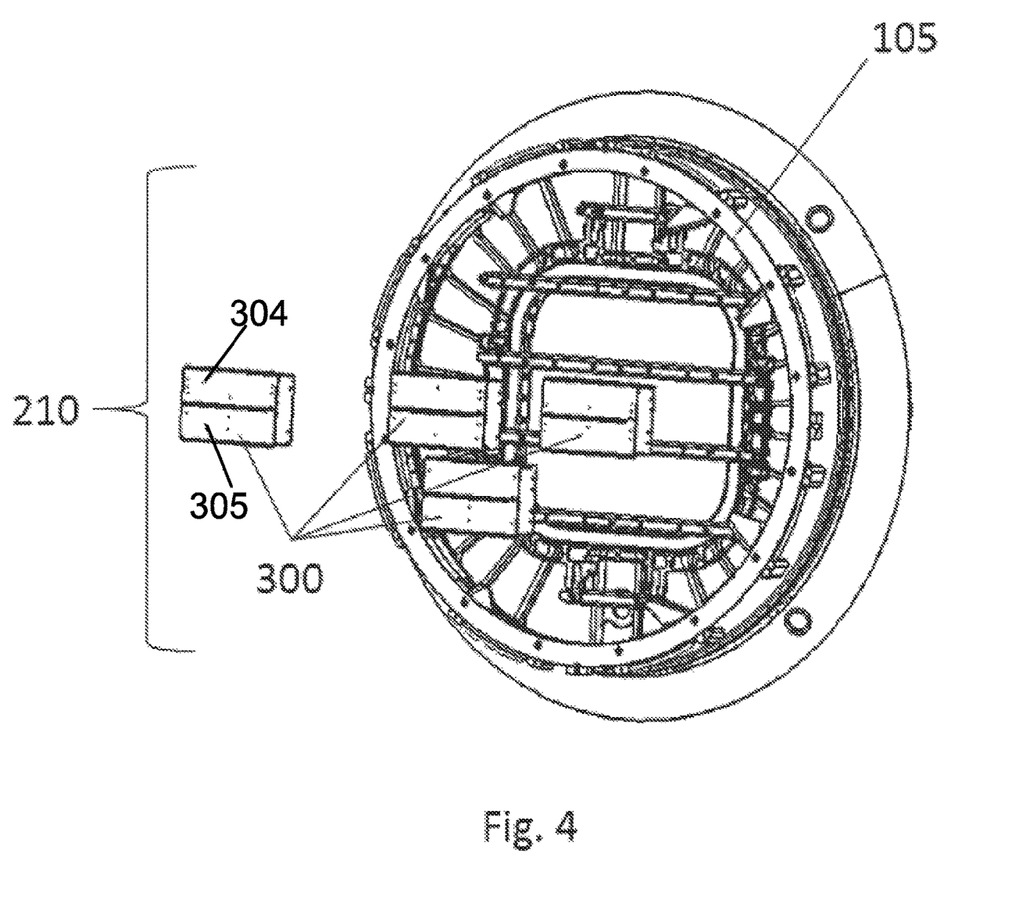
FIG. 4 illustrates installation of one embodiment of a satellite deployment mechanism mounted on to the attachment hardware installed inside a portion of a common berthing mechanism.

FIG. 4 illustrates installation of one embodiment of a satellite deployment mechanism mounted on to the attachment hardware installed inside a portion of a common berthing mechanism. In the embodiment shown, instances of satellite deployment mechanism 300 are depicted as being moved into various locations within the mounting system 210. Although not explicitly shown here, electrical cables may be coupled to the various instances of satellite deployment mechanism 300, when mounted, to enable commands (e.g., electrical signals) to be sent to the corresponding instances of a separation mechanism 308 implemented therein. These cables may be accommodated within the various components of mounting system 210, e.g., within or on the base brackets 200-202 and/or cross-rails 203-208. A separate electrical cable may be provided for each instance of the satellite deployment mechanism 300 that is mounted to the spacecraft via mounting system 210. The cables, terminated on one end at corresponding instances of a separation mechanism 308, may be terminated on the other end within the parent spacecraft.

A "soft dock" mechanism may be utilized to provide a temporary restraining force to each of the instances of satellite deployment mechanism 300. This may enable the instances of satellite deployment mechanism 300 to be mounted by personnel when the parent spacecraft is in orbit without floating away. The soft dock mechanism may include magnets, retaining clips (e.g., made of plastic) or other mechanisms that restrain the instances of satellite deployment mechanism 300. A locking mechanism may be utilized to lock the instances of satellite deployment mechanism 300 in place once installed, thereby preventing them from separating from CBM 105 and thus from the parent spacecraft.

Figure 5:
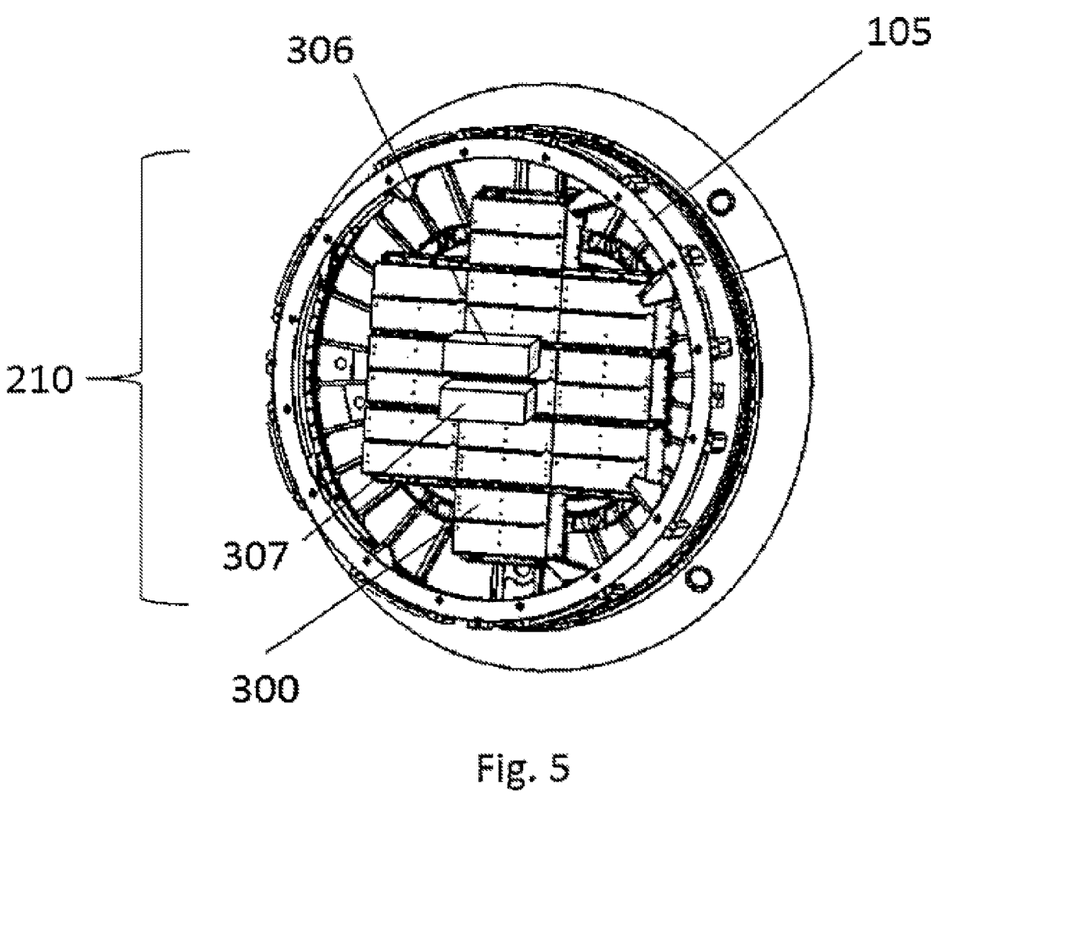
FIG. 5 depicts a satellite being deployed from one embodiment of a satellite deployment mechanism installed on attachment hardware in a common berthing mechanism.

FIG. 5 depicts a satellite being deployed from one embodiment of a satellite deployment mechanism installed on attachment hardware in a common berthing mechanism. In the illustrated example, mounting system 210 is attached to CBM 105. A number of instances of satellite deployment mechanism 300 are mounted to CBM 105 via mounting system 210. A pair of satellites 306 and 307 are shown as having been ejected from a corresponding instance of the satellite deployment mechanism 300.

Figure 6:
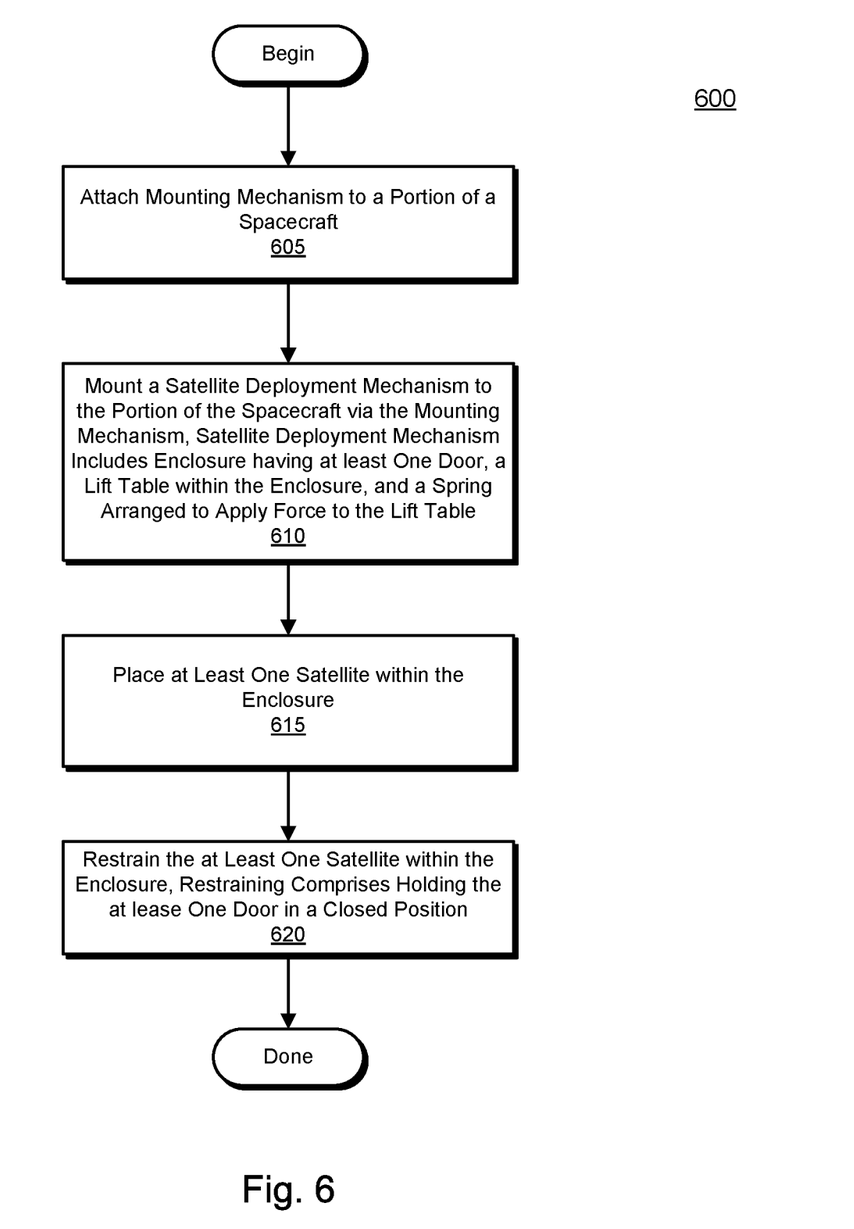
FIG. 6 is a flow diagram illustrating one embodiment of a method for preparing satellites for deployment from a satellite deployment mechanism.

FIG. 6 is a flow diagram illustrating one embodiment of a method for preparing satellites for deployment from a satellite deployment mechanism. Method 600 as disclosed herein may be performed with any of the hardware embodiments discussed above, as well as any variation of the hardware that falls within the scope of this disclosure.

Method 600 includes attaching a mounting mechanism to a portion of a spacecraft (block 605). The method further includes mounting a satellite deployment mechanism to the portion of the spacecraft via the mounting mechanism, wherein the satellite deployment mechanism includes an enclosure having at least one door, a lift table within the enclosure, and a spring arranged to apply force to the lift table (block 610). The method further includes placing at least one satellite within the enclosure (block 615) and restraining the at least one satellite within the enclosure, wherein restraining the at least one satellite comprises holding the at least one door in a closed position (block 620).

In various embodiments, the portion of the spacecraft comprises a common berthing mechanism (CBM), and wherein the method further comprises securing a bracket of the mounting system under ribs of a bulkhead of the CBM. The bracket includes, in various embodiment, a sliding block attached to base brackets, and wherein the method further comprises sliding the block under the ribs to lock the base brackets in place. The method may further include mounting a plurality of instances of the satellite deployment mechanism to the portion of the spacecraft via the mounting mechanism.

The method may also include deploying the at least one satellite. Deploying the at least one satellite may include opening the at least one door and ejecting the at least one satellite from the enclosure, wherein ejecting comprises the spring causing the lift table to move toward an opening in the enclosure caused by opening the at least one door. The satellite deployment mechanism may include a guiding mechanism. Accordingly, the method may include a guiding mechanism causing the lift table to eject the at least one satellite in a single direction that is perpendicular to a surface of the lift table.

Although not depicted, a similar method is also contemplated for launching/deploying satellites using the satellite deployment mechanism described herein. In some embodiments, this method may be performed after performance of method 600 to prepare satellites for deployment from the satellite deployment mechanism. In various embodiments, this method may include supplying an electrical signal to the satellite deployment mechanism to cause opening of at least one door of the satellite deployment mechanism and ejecting at least one satellite from an enclosure of the satellite deployment mechanism by a spring of the satellite deployment mechanism causing a lift table to move toward an opening in the enclosure resulting from opening the at least one door.

Numerous variations and modifications will become apparent to those skilled in the art once the above disclosure is fully appreciated. It is intended that the following claims be interpreted to embrace all such variations and modifications.

What is claimed is:
1. An apparatus, comprising:
a satellite deployment mechanism, wherein the satellite deployment mechanism includes:
an enclosure having at least one door;
a lift table implemented within the enclosure; and
a spring arranged to apply force to the lift table;
a guiding mechanism positioned below the lift table, wherein the guiding mechanism [is a scissor lift below the lift table which uses a spring to eject the satellites in a single direction normal to the plane of the lift]: and
a mounting system arranged to mount the satellite deployment mechanism to a portion of a spacecraft, wherein the mounting system comprises a bracket configured to be secured under ribs of the spacecraft:
wherein, responsive to opening the at least one door, the spring is configured to cause the lift table to eject one or more satellites from the enclosure and wherein the guiding mechanism controls the direction of the lift table.

2. The apparatus of claim 1, guiding mechanism causes the force to be applied to the lift table in a single direction that is perpendicular to a surface of the lift table irrespective of a center of mass of the one or more satellites.

3. The apparatus of claim 1, guiding mechanism causes the force to be applied to the lift table in a single direction that is perpendicular to a surface of the lift table irrespective of a shape of one or more satellites.

4. The apparatus of claim 1, further comprising a separation mechanism configured to restrain the at least one door to a shut position, and further configured to release the door responsive to receiving an electrical signal.

5. The apparatus of claim 4, wherein the enclosure is configured to restrain the one or more satellites when the at least one door is in the shut position.

6. The apparatus of claim 1, wherein the portion of the spacecraft is an unmodified common berthing mechanism (CBM), wherein the mounting system is attached to the CBM.

7. The apparatus of claim 6, wherein the bracket secures under ribs of a bulkhead of the CBM.

8. The apparatus of claim 7, wherein the bracket includes a sliding block attached to base brackets, wherein the sliding block is configured to slide under the ribs to lock the base brackets in place.

9. The apparatus of claim 1, wherein the mounting system is configured to mount a plurality of instances of the satellite deployment mechanism.

10. The apparatus of claim 1, wherein the spring is configured to cause the lift table to eject one or more satellites from the enclosure at a specified velocity.

11. A method comprising:
    attaching a mounting mechanism to a portion of a spacecraft, the mounting mechanism comprising a bracket for securing under ribs of the spacecraft;
    mounting a satellite deployment mechanism to the portion of the spacecraft via the mounting mechanism, the satellite deployment mechanism including an enclosure having at least one door, a lift table within the enclosure, a guiding mechanism positioning below the lift table and forming parallelograms on each side of the lift table, and a spring arranged to apply force to the lift table;
    placing at least one satellite within the enclosure; and
    restraining the at least one satellite within the enclosure holding the at least one door in a closed position.

12. The method of claim 11, further comprising securing the bracket under ribs of a bulkhead of the spacecraft, the spacecraft being a common berthing mechanism (CBM).

13. The method of claim 12, further comprising:
    providing the bracket having a sliding block attached to base brackets; and
    sliding the sliding block under the ribs to lock the base brackets in place.

14. The method of claim 11, further comprising mounting a plurality of instances of the satellite deployment mechanism to the portion of the spacecraft via the mounting mechanism.

15. The method of claim 11, further comprising, during deployment of the at least one satellite, operating the guiding mechanism for causing the lift table to eject the at least one satellite in a single direction that is perpendicular to a surface of the lift table.

16. The method of claim 11, further comprising deploying the at least one satellite, wherein deploying the at least one satellite includes:
    opening the at least one door;
    ejecting the at least one satellite from the enclosure, wherein ejecting comprises the spring causing the lift table to move toward an opening in the enclosure caused by opening the at least one door and the guiding mechanism controlling the direction of the lift table.

\* \* \* \* \*